United States Patent [19]

Bock et al.

[11] Patent Number: 4,806,580

[45] Date of Patent: Feb. 21, 1989

[54] STABILIZER MIXTURES FOR PLASTICS

[75] Inventors: Gustav Bock, Neustadt; Hubert Trauth, Dudenhofen; Wilhelm Weber, Neustadt; Peter Lechtken, Frankenthal, all of Fed. Rep. of Germany

[73] Assignee: BASF Aktiengesellschaft, Ludwigshafen, Fed. Rep. of Germany

[21] Appl. No.: 107,461

[22] Filed: Oct. 9, 1987

[30] Foreign Application Priority Data

Oct. 10, 1986 [DE] Fed. Rep. of Germany ....... 3634531

[51] Int. Cl.⁴ .......................... C08K 5/52; C08K 5/15
[52] U.S. Cl. ..................... 524/110; 524/126; 524/147; 524/151; 524/153; 252/400.24; 252/404
[58] Field of Search ............... 524/110, 126, 147, 151, 524/153; 252/400.24, 404

[56] References Cited

U.S. PATENT DOCUMENTS

| | | | |
|---|---|---|---|
| 4,348,308 | 9/1982 | Minagawa et al. | 524/110 |
| 4,404,304 | 9/1983 | Horner et al. | 524/110 |
| 4,511,685 | 4/1985 | Nissen et al. | 524/110 |
| 4,680,327 | 7/1987 | Hettche et al. | 524/110 |

FOREIGN PATENT DOCUMENTS

| | | | |
|---|---|---|---|
| 71149 | 6/1978 | Japan | 524/110 |
| 20056 | 2/1979 | Japan | 524/110 |
| 5504379 | 5/1979 | Japan . | |

Primary Examiner—Kriellion Morgan
Attorney, Agent, or Firm—Keil & Weinkauf

[57] ABSTRACT

Stabilizer mixtures for stabilizing plastics comprising one part by weight of a chroman derivative (I) of the general formula

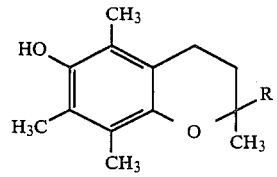

where R=

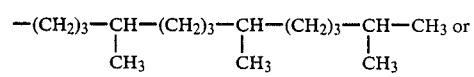

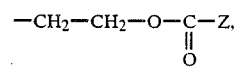

where $Z = C_7-C_{30}$-alkyl, $-CH_2CH_2-S-[C_1-C_{30}$-alkyl] or

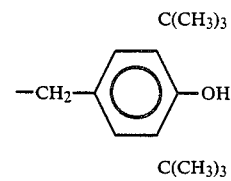

and from 5 to 14 parts by weight of an organic phosphite of the general formula (II)

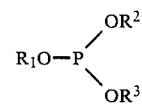

where $R^1$, $R^2$ and $R^3$ are identical of different alkyl and/or aryl or of an organic phosphonite of the formula (III)

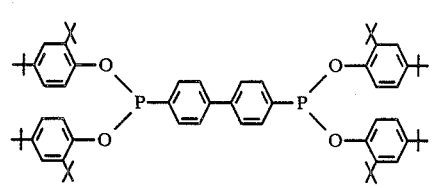

where + is $C(CH_3)_3$, a mixing ratio (a):(b) of from 1:6 to 1:10 being preferred.

6 Claims, No Drawings

STABILIZER MIXTURES FOR PLASTICS

The present invention relates to a stabilizer mixture for stabilizing a plastics material in processing.

Stabilizer mixtures of this type are added to plastics before or during processing to stabilize the plastics against decomposition. It is known that the actions of various stabilizer systems can be additive.

German Pat. Nos. 1,114,319 and 1,136,102 disclose using α-tocopherol as a stabilizer for plastics.

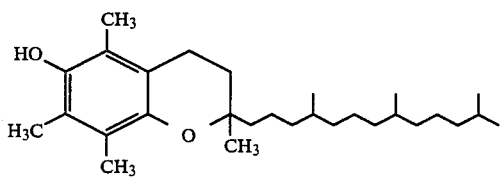

yet α-tocopherol gives rise to discoloration, so that in practice it is particularly unsuitable for stabilizing colorless plastics. In addition, the stabilization obtained falls short of the level obtained with phenolic stabilizers. For that reason, α-tocopherol has still to replace the hitherto customary phenolic stabilizers, although in principle, as a physiologically safe natural substance, α-tocopherol would be preferable and even though the phenolic stabilizers are not satisfactory in every respect.

Japanese preliminary published publication No. 53/141,354 discloses that mixtures of α-tocopherol and a saccharide or a polyhydric alcohol are more stable to discoloration than any tocopherol alone; however, the stabilization effects are not adequate.

German laid-open applications DOS Nos. 3,010,505, 3,103,707 and 3,103,740 and EP-A1-No. 0,191,463 disclose chroman derivatives of the formula:

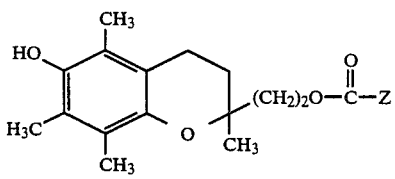

where z is a $C_7-C_{30}$-alkyl, $-CH_2-CH_2-S[C_1-C_{30}-alkyl]$ or

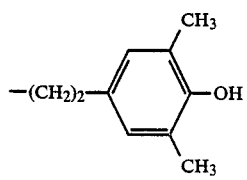

and propose they be used for stabilizing organic materials.

The use of triesters of phosphorous acid as stabilizers in plastics has been known for a long time. It is similarly known, for example from J. Voigt, Die Stabilisierung der Kunststoffe gegen Licht und Wärme, 1st edition, Springer Verlag, 1966, page 323, that they are preferably used in the form of combinations of phosphites with other antioxidants.

Japanese Pat. No. 4,315,685 proposes that tris(2,4-ditert.-butyl-5-methylphenyl)phosphite be used in a combination with various antioxidants. However, under the heat stress conditions prevailing in the processing of polyolefinic substrates, these mixtures lead to yellowness in the polymer.

Japanese preliminary published application No. 55,043/79 described polyolefin mixtures where vitamins from the E group vitamins and phosphites are mixed into the polyolefins stabilizers. In Examples 1–6, vitamin E and various phosphites are used in a ratio of 1:1.6 to 1:3.3 while in Examples 7–12 an additional 0.01 part by weight of 2,6di-tert.-butyl-p-cresol is added to improve the stability to discoloration. The results of these examples show that these mixtures are not satisfactory in respect of yellowing. In addition, the stabilizer system is not economical owing to the high proportion of costly vitamin E.

It is an object of the present invention to find an improved stabilizer system in respect of the processing stability and the color of the products.

We have found that this object is achieved with the stabilizer mixture claimed in claim 1 or 2.

The stabilizer system according to the invention comprises: (a) a chroman derivative (I) of the general formula

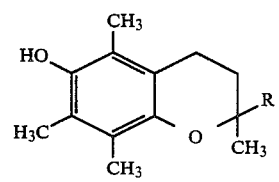

where R=

$-(CH_2)_3-CH-(CH_2)_3-CH-(CH_2)_3-CH-CH_3$ or
$\phantom{-(CH_2)_3-}CH_3 \phantom{-(CH_2)_3-}CH_3 \phantom{-(CH_2)_3-}CH_3$

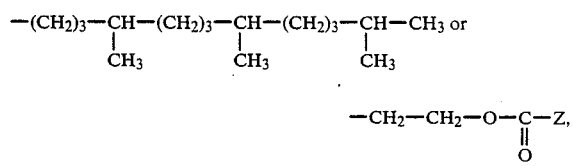

where $Z=C_7-C_{30}$-alkyl, $-CH_2CH_2-S-[C_1-C_{30}-alkyl]$ or

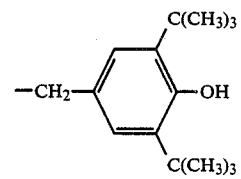

and (b) an organic phosphite of the general formula (II)

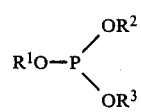

where $R^1$, $R^2$ and $R^3$ are identical or different alkyl and/or aryl or an organic phosphonite of the formula (III)

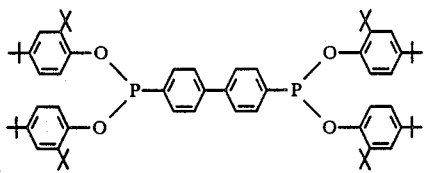

III where + is C(CH₃)₃, in a ratio of (a):(b) of from 1:5 to 1:14 parts by weight, preferably in a ratio of from 1:6 to 1:10 parts by weight. The alkyl and/or aryl groups $R^1$, $R^2$ and $R^3$ are preferably $C_2$–$C_{12}$-alkyl or phenyl which may be substituted by $C_4$–$C_{18}$-alkyl.

The mixtures of the invention in the claimed weight ratios produce an appreciably improved stability to discoloration and a much improved processing stability in plastics compared not only with the stabilizer mixtures described in the examples of Japanese preliminary published application No. 55,043/79 but also with other known stabilizers, for the most part phenolic compounds, phosphites or mixtures thereof. A further advantage of the stabilizer system according to the invention is the inexpensiveness of these mixtures owing to a reduced proportion of costly vitamin E.

The phosphites which are usable according to the invention include not only liquid but also crystalline products. Examples of phosphites are:
  trisalkyl phosphites having preferably long-chain or branched alkyl, such as octyl, nonyl, isononyl, decyl or isodecyl;
  triaryl phosphites having unsubstituted or monoalkyl- or polyalkyl-substituted aryl, such as phenyl, nonylphenyl or 2,4-di-tert.-butylphenyl; and
  mixed aryl alkyl phosphites, such as diisodecyl phenyl phosphite or diphenyl pentaerythritol diphosphite.

The phosphites of the formula II are synthesized in a conventional manner, for example by reacting $PCl_3$ with a monohydric or polyhydric alcohol in the presence of an organic base or with a substituted or unsubstituted phenol without solvent at from 20° to 250° C. The mixed alkyl aryl phosphites are prepared for example by reacting triphenyl phosphite with a monohydric or polyhydric alcohol in the presence of a basic catalyst, preferably in the absence of a solvent. Phosphonite (III) is known and commercially available from Ciba-Geigy under the trade name "Irgafos P-EPQ", so that no further description is necessary.

The stabilizer mixture according to the invention is incorporated in a concentration of from 0.005 to 5, preferably from 0.05 to 1, % by weight, based on the material to be stabilized.

In addition to the stabilizer system of the invention, composed of components (a) and (b), it is also possible to incorporate in the plastics customary amounts of further stabilizer additives, for example the known stabilizer synergists calcium stearate and distearyl thiodipropionate (S—$(CH_2CH_2$—$COOC_{18}H_{37})_2$).

It is also possible to combine the stabilizers with plastics to prepare concentrates, then to process these concentrates together with the plastics to be stabilized.

Concentrates are advantageous in processing since they are easier to handle and meter.

Suitable plastics are in particular thermoplastics, such as polyvinyl chloride, styrene polymers, nylons, polycarbonate, polyphenylene oxide, polyesters, polyolefins, preferably polyethylene and polypropylene, polyurethanes and thermosetting resins.

The suitability and effectiveness of stabilizers are dependent in particular on the following criteria:
1. Color The thermoplastic, thermosetting resin or polyurethane should not be discolored by the stabilizer. This requirement is particularly important for colorless thermoplastics, thermosetting resins and polyurethanes.

2. Processing stability

This requires invariance in the properties of thermoplastics to the mechanical and thermal stress in shaping processes such as extrusion and injection molding.

A numerical index of the processing stability is derivable from the change in the melt flow properties of the thermoplastics in question after repeated shaping from the melt.

The corresponding melt flow index test is described in ASTM D 1238-65T. Another important criterion for the processing stability is the change in color after repeated shaping from the melt. This change should be as small as possible as indicated by the ASTM D 1925 Yellowness Test.

In relation to color stability and processing stability, the mixtures in the weight ratio according to the invention exhibit particular advantages over the mixtures described in Japanese preliminary published application No. 55,043/79 and also over the prior art phenolic antioxidants.

The invention will now be additionally illustrated by reference to the following examples.

The stabilizer-containing polymers were assessed in respect of color quality and processing stability.

I. The color quality is reported in terms of the Yellowness Index YI, determined in polypropylene in accordance with the ASTM D 1925 Yellowness Test.

The YI values reported are always the result of averaging two measurements. The higher values, the lower the color quality, ie. the worse the discoloration.

The color quality values mentioned correspond to the following visual impressions:
  up to 2 no visible discoloration
  3–5 very slight discoloration
  5–10 slight but clearly visible discoloration
  10–20 distinctly visible discoloration
  >20 bad discoloration The stabilizer was incorporated in the same way in all cases, and the material was processed into granules, which were molded into sheets 1 mm in thickness on which the Yellowness Index was determined.

II. The processing stability was determined on the same polypropylene as in (I). To this end, the mixture was extruded and granulated. This single-extrusion specimen was then measured to determine the melt flow index in accordance with DIN 53,735; the result was called $MFI_1$. This specimen was then extruded and granulated a further 7 times, and this eight-extrusion specimen was then measured to determine the melt flow index as described above to give $MFI_8$.

The melt flow indices were then combined so as to form the ratio $$\frac{MFI_8}{MFI_1}$$

The higher the ratio, the smaller the processing stability.

The one-time and eight-time extrusion-granulation specimens were also measured to determine the Yellowness Indices $YI_1$ and $YI_8$, respectively, in accordance with (I).

The polypropylene (PP) used was in all cases additive-free dechlorinated polypropylene.

The following stabilizer components were used in Examples 1-24:

Stabilizer a:
($a^1$) = DL-α-tocopherol
($a^2$) = 2,5,7,8-tetramethyl-2-(2'-stearyloxyethyl)chroman Stabilizer b:
($b^1$) = trisnonylphenyl phosphite

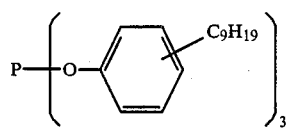

($b^2$) = tetraphenyl dipropylene glycol diphosphite

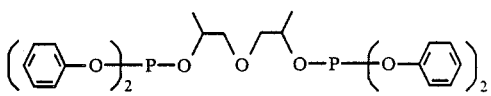

($b^3$) = tris-(2,4-di-tert.-butylphenyl)phosphite

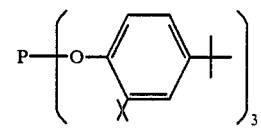

($b^4$) = tetrakis(2,4-di-tert.-butylphenyl) 4,4'-biphenylenediphosphonite

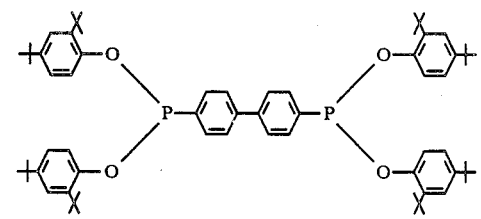

TABLE

| Example | Stabilizer (a) | Stabilizer (b) | Concentration: % by weight based on PP | Ratio (a):(b) parts by weight | Melt flow index MFI$_1$ g/10 min | Melt flow index MFI$_8$ g/10 min | Yellowness Index YI$_1$ | Yellowness Index YI$_8$ |
|---|---|---|---|---|---|---|---|---|
| Examples according to the invention | | | | | | | | |
| 1 | ($a^1$) | Trisnonylphenyl phosphite | 0.1 | 1:5 | 4.2 | 4.8 | 1.0 | 4.5 |
| 2 | ($a^1$) | Trisnonylphenyl phosphite | 0.1 | 1:6 | 4.2 | 4.8 | 0.6 | 3.4 |
| 3 | ($a^1$) | Trisnonylphenyl phosphite | 0.1 | 1:8 | 4.1 | 4.7 | 0.7 | 3.5 |
| 4 | ($a^1$) | Trisnonylphenyl phosphite | 0.1 | 1:10 | 4.2 | 4.9 | 0.7 | 3.6 |
| 5 | ($a^1$) | Trisnonylphenyl phosphite | 0.1 | 1:12 | 4.5 | 6.6 | 0.6 | 3.5 |
| 6 | ($a^1$) | Trisnonylphenyl phosphite | 0.1 | 1:14 | 4.9 | 8.0 | 0.7 | 3.6 |
| 7 | ($a^2$) | Trisnonylphenyl phosphite | 0.1 | 1:6 | 4.3 | 5.8 | 0.6 | 3.2 |
| 8 | ($a^1$) | Tetraphenyl dipropylene glycol diphosphite | 0.1 | 1:6 | 4.3 | 5.5 | 0.7 | 3.6 |
| 9 | ($a^2$) | Tetraphenyl dipropylene glycol diphosphite | 0.1 | 1:6 | 4.4 | 6.0 | 0.7 | 3.5 |
| 10 | ($a^1$) | Tris-(2,4-di-tert.-butylphenyl) phosphite | 0.1 | 1:6 | 4.4 | 6.2 | 0.6 | 3.2 |
| 11 | ($a^2$) | Tris-(2,4-di-tert.-butylphenyl) phosphite | 0.1 | 1:6 | 4.5 | 6.4 | 0.6 | 3.1 |
| 12 | ($a^1$) | Tetrakis(2,4-di-tert.-butylphenyl)-4-4'-biphenylenediphosphonite | 0.1 | 1:6 | 4.3 | 5.9 | 0.6 | 3.1 |
| 13 | ($a^2$) | Tetrakis(2,4-di-tert.-butylphenyl)-4-4'-biphenylenediphosphonite | 0.1 | 1:6 | 4.4 | 6.1 | 0.6 | 3.0 |
| Comparative Examples | | | | | | | | |
| 14 | ($a^1$) | — | 0.1 | — | 4.5 | 9.5 | 18 | 30.0 |
| 15 | ($a^2$) | — | 0.1 | — | 4.5 | 9.0 | 14 | 26.0 |
| 16 | — | Trisnonylphenyl phosphite | 0.1 | — | 4.7 | 9.4 | 0.6 | 3.0 |
| 17 | — | Tetraphenyl dipropylene glycol diphosphite | 0.1 | — | 4.8 | 10.6 | 0.6 | 3.0 |
| 18 | — | Tris-(2,4-di-tert.- | 0.1 | — | 4.9 | 10.8 | 0.6 | 2.9 |

TABLE-continued

| Example | Stabilizer (a) | Stabilizer (b) | Concentration: % by weight based on PP | Ratio (a):(b) parts by weight | Melt flow index MFI$_1$ g/10 min | Melt flow index MFI$_8$ g/10 min | Yellowness Index YI$_1$ | Yellowness Index YI$_8$ |
|---|---|---|---|---|---|---|---|---|
| 19 | — | butylphenyl) phosphite Tetrakis(2,4-di-tert.-butylphenyl)-4,4'-biphenyl diphosphonite | 0.1 | — | 4.6 | 8.3 | 0.6 | 2.8 |
| 20 | (a$^1$) | Trisnonylphenyl phosphite | 0.1 | 1:1 | 4.3 | 5.3 | 14.0 | 26.0 |
| 21 | (a$^1$) | Trisnonylphenyl phosphite | 0.1 | 1:2 | 4.3 | 5.2 | 10.0 | 23.0 |
| 22 | (a$^1$) | Trisnonylphenyl phosphite | 0.1 | 1:4 | 4.1 | 4.8 | 3.0 | 9.0 |
| 23 | (a$^1$) | Trisnonylphenyl phosphite | 0.1 | 1:15 | 5.7 | 11.0 | 0.7 | 3.7 |
| 24 | (a$^1$) | Trisnonylphenyl phosphite | 0.1 | 1:16 | 6.0 | 11.5 | 0.6 | 3.7 |

We claim:

1. A stabilizer mixture for stabilizing a plastic material, comprising
   (a) one part by weight of a chroman derivative (I) of the formula

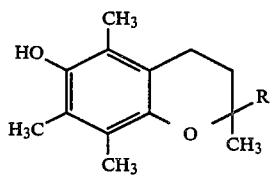

where R =

$-(CH_2)_3-CH-(CH_2)_3-CH-(CH_2)_3-CH-CH_3$ or
       $\;\;\;\;\;\;\;\;\;|\;\;\;\;\;\;\;\;\;\;\;\;\;\;|\;\;\;\;\;\;\;\;\;\;\;\;\;\;|$
       $\;\;\;\;\;\;\;\;\;CH_3\;\;\;\;\;\;\;\;\;CH_3\;\;\;\;\;\;\;\;\;CH_3$

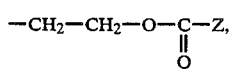

where $Z = C_7-C_{30}$-alkyl, $-CH_2CH_2-S-[C_1-C_{30}$-alkyl$]$ or

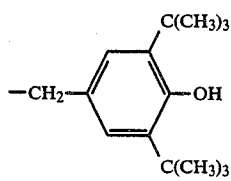

and (b) from 5 to 14 parts by weight of an organic phosphite of the formula (II)

$$R^1O-P\begin{matrix}OR^2\\OR^3\end{matrix}$$

where $R^1$, $R^2$ and $R^3$ are identical or different alkyl and/or aryl or of an organic phosphonite of the formula (III)

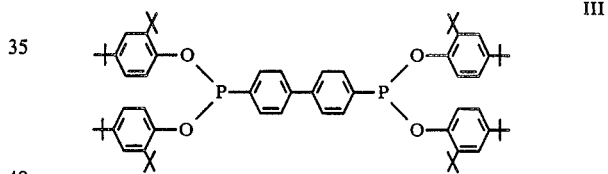

where + is $C(CH_3)_3$.

2. The stabilizer mixture of claim 1, wherein the mixing ratio of components (a):(b) is from 1:6 to 1:10.

3. A plastics material containing from 0.005 to 5.0 percent by weight, based on the material to be stabilized, of a stabilizer mixture as defined in claim 1.

4. A plastics material containing from 0.005 to 5.0% by weight, based on the material to be stabilized, of a stabilizer mixture as defined in claim 2.

5. A plastics material as defined in claim 3, wherein the amount of stabilizer mixture is from 0.05 to 1% by weight, based on the material to be stabilized.

6. A plastics material as defined in claim 4, wherein the amount of stabilizer mixture is from 0.05 to 1% by weight, based on the material to be stabilized.

* * * * *